(12) United States Patent
Kokushi et al.

(10) Patent No.: US 12,140,956 B2
(45) Date of Patent: Nov. 12, 2024

(54) SAFETY DEVICE, SELF-PROPELLED ROBOT SYSTEM, AND CONTROLLING METHOD

(71) Applicant: KAWASAKI JUKOGYO KABUSHIKI KAISHA, Kobe (JP)

(72) Inventors: Hiroki Kokushi, Kobe (JP); Takayuki Iga, Kobe (JP); Takuya Ichise, Kobe (JP); Ryota Sakai, Kobe (JP); Risa Momota, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 232 days.

(21) Appl. No.: 17/791,921

(22) PCT Filed: Dec. 28, 2020

(86) PCT No.: PCT/JP2020/049187
§ 371 (c)(1),
(2) Date: Jul. 11, 2022

(87) PCT Pub. No.: WO2021/145220
PCT Pub. Date: Jul. 22, 2021

(65) Prior Publication Data
US 2023/0048039 A1  Feb. 16, 2023

(30) Foreign Application Priority Data

Jan. 17, 2020  (JP) ................. 2020-005801

(51) Int. Cl.
*G05D 1/00* (2024.01)
*B25J 5/00* (2006.01)

(52) U.S. Cl.
CPC ............ *G05D 1/0214* (2013.01); *B25J 5/007* (2013.01); *G05D 1/0248* (2013.01)

(58) Field of Classification Search
CPC ...... G05D 1/0214; G05D 1/0248; B25J 5/007
See application file for complete search history.

(56) References Cited

U.S. PATENT DOCUMENTS

2017/0320212 A1  11/2017  Frisk et al.
2018/0326586 A1  11/2018  Magnanimo et al.

FOREIGN PATENT DOCUMENTS

| DE | 10 2010 046 327 A1 | | 3/2012 |
| JP | 09038891 A | * | 2/1997 |
| JP | H9-38891 A | | 2/1997 |
| JP | 2001273032 A | * | 10/2001 |
| JP | 2002-264070 A | | 9/2002 |
| JP | 6481495 B2 | | 3/2019 |

* cited by examiner

*Primary Examiner* — Peter D Nolan
*Assistant Examiner* — Luke Huynh
(74) *Attorney, Agent, or Firm* — METROLEX IP LAW GROUP, PLLC; Robert L. Scott, Esq.

(57) ABSTRACT

A safety device according to the present disclosure includes a sensor that is attached to a self-propellable travel device or a robot provided to the travel device, is set with a given detection area on the basis of a position of the sensor, and detects an object existing within the given detection area. The safety device further includes a motion suppressing device that suppresses motions of the travel device and the robot, when the existence of the object within the given detection area is detected by the sensor, and an area changing device that changes the given detection area according to operating states of the travel device and the robot.

12 Claims, 8 Drawing Sheets

SAFETY DEVICE, SELF-PROPELLED ROBOT SYSTEM, AND CONTROLLING METHOD

CROSS-REFERENCE TO RELATED APPLICATIONS

This application is a national stage entry of International Application No. PCT/JP2020/049187 filed on Dec. 28, 2020, which claims priority based on the Article 8 of Patent Cooperation Treaty from prior Japanese Patent Application No. 2020-005801, filed on Jan. 17, 2020, the entire contents of all of which are incorporated herein by reference.

TECHNICAL FIELD

The present disclosure relates to a safety device, a self-propelled robot system, and a controlling method.

BACKGROUND ART

Conventionally, it is known that a safety device for a self-propellable travel device and a robot provided to the travel device. Such a safety device is proposed in Patent Document 1, for example.

In the safety device of Patent Document 1, the reflection factor of a robot with a higher priority is set higher than the reflection factor of a robot with a lower priority. Thus, a sensing signal emitted from the robot with the lower priority is reflected by the robot with the higher priority, and the light is received with sufficient intensity by the robot with the lower priority. On the other hand, the sensing signal emitted from the robot with the higher priority is reflected by the robot with the lower priority, and the light is received with insufficient intensity by the robot with the higher priority. Thus, the safety device of Patent Document 1 allows the robot with the higher priority to work with a higher priority.

REFERENCE DOCUMENT(S) OF CONVENTIONAL ART

Patent Document

[Patent Document 1] JP1997-038891A

DESCRIPTION OF THE DISCLOSURE

Problem to be Solved by the Disclosure

However, according to the safety device of Patent Document 1, it does not take into consideration that motions of the travel device and the robots are suppressed according to the operating states of the travel device and the robots.

Thus, one purpose of the present disclosure is to provide a safety device, a self-propelled robot system, and a controlling method, capable of suppressing motions of a travel device and a robot according to operating states of the travel device and the robot.

Means for Solving the Problem

In order to solve the problem, a safety device according to the present disclosure includes a sensor that is attached to a self-propellable travel device or a robot provided to the travel device, is set with a given detection area on the basis of a position of the sensor, and detects an object existing within the given detection area, a motion suppressing device that suppresses motions of the travel device and the robot, when the existence of the object within the given detection area is detected by the sensor, and an area changing device that changes the given detection area according to operating states of the travel device and the robot.

Effect of the Disclosure

According to the present disclosure, a safety device, a self-propelled robot system, and a controlling method can be provided, which are capable of suppressing motions of a travel device and a robot according to operating states of the travel device and the robot.

BRIEF DESCRIPTION OF DRAWINGS

FIG. 6(A) is a schematic view illustrating a first detection area, and FIG. 6(B) is a schematic view illustrating a second detection area.

MODE FOR CARRYING OUT THE DISCLOSURE

Figure 1:
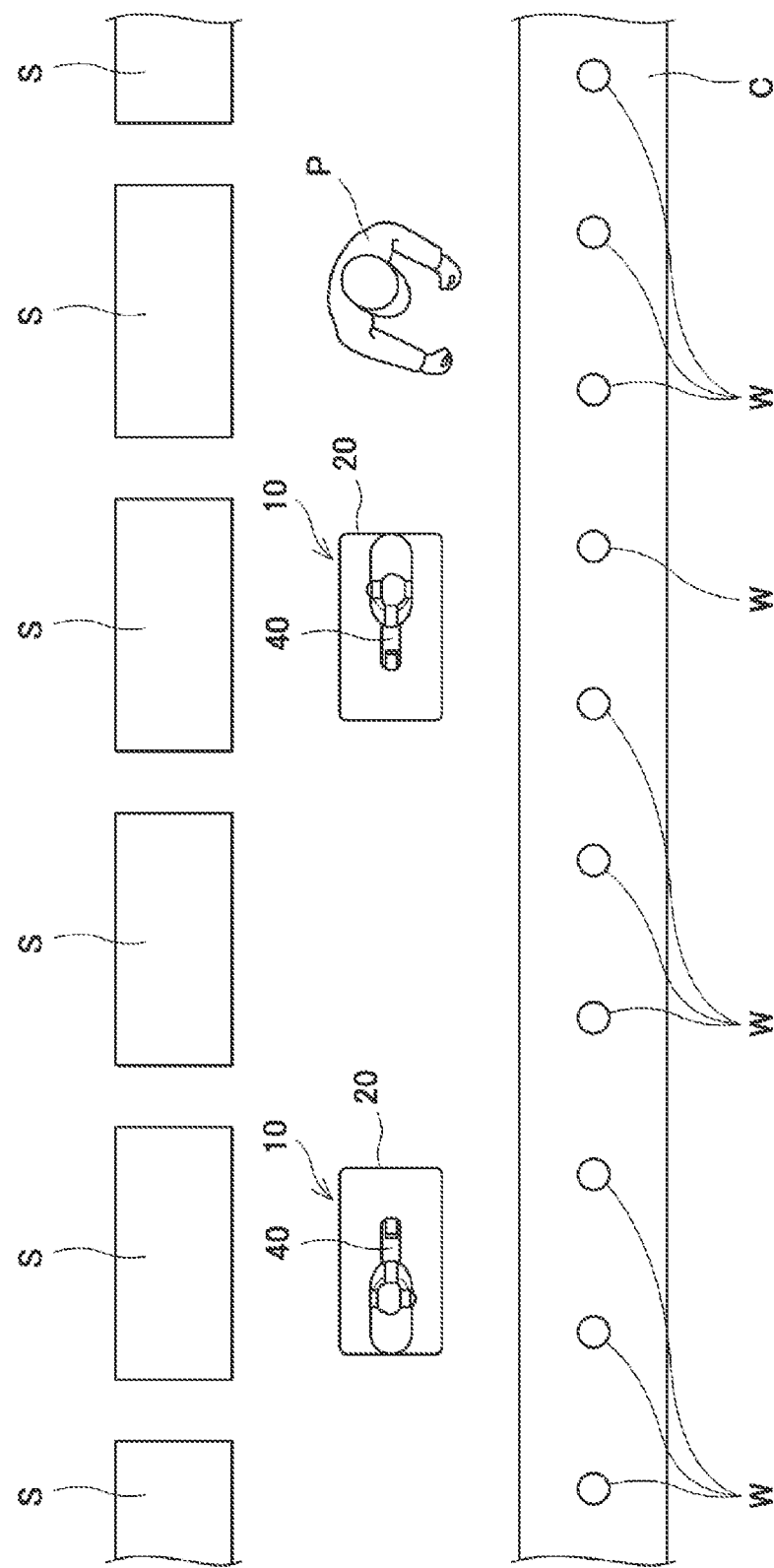
FIG. 1 is a schematic view illustrating a situation that a self-propelled robot system according to one embodiment of the present disclosure is applied to a work site.

Hereinafter, a safety device, a self-propelled robot system, and a controlling method according to one embodiment of the present disclosure are described with reference to the accompanying drawings. Note that the present disclosure is not limited by this embodiment. Further, below, throughout the drawings, the same reference characters are assigned to the same or corresponding elements to omit redundant explanation.

(Self-Propelled Robot System 10)

FIG. 1 is a schematic view illustrating a situation that a self-propelled robot system according to this embodiment is applied to a work site. As illustrated in FIG. 1, the self-propelled robot system 10 according to this embodiment is used for conveying a plurality of workpieces W which are sequentially conveyed by a conveyor C to one of a plurality of shelves S arrayed in parallel to a conveying direction of the conveyor C. In this embodiment, in order to perform the conveying work, two self-propelled robot systems 10 are disposed between the conveyor C and the plurality of shelves S. Note that a worker P is located near the two self-propelled robot systems 10, to perform the conveying work which is the same as that of the two self-propelled robot systems 10.

Figure 2:
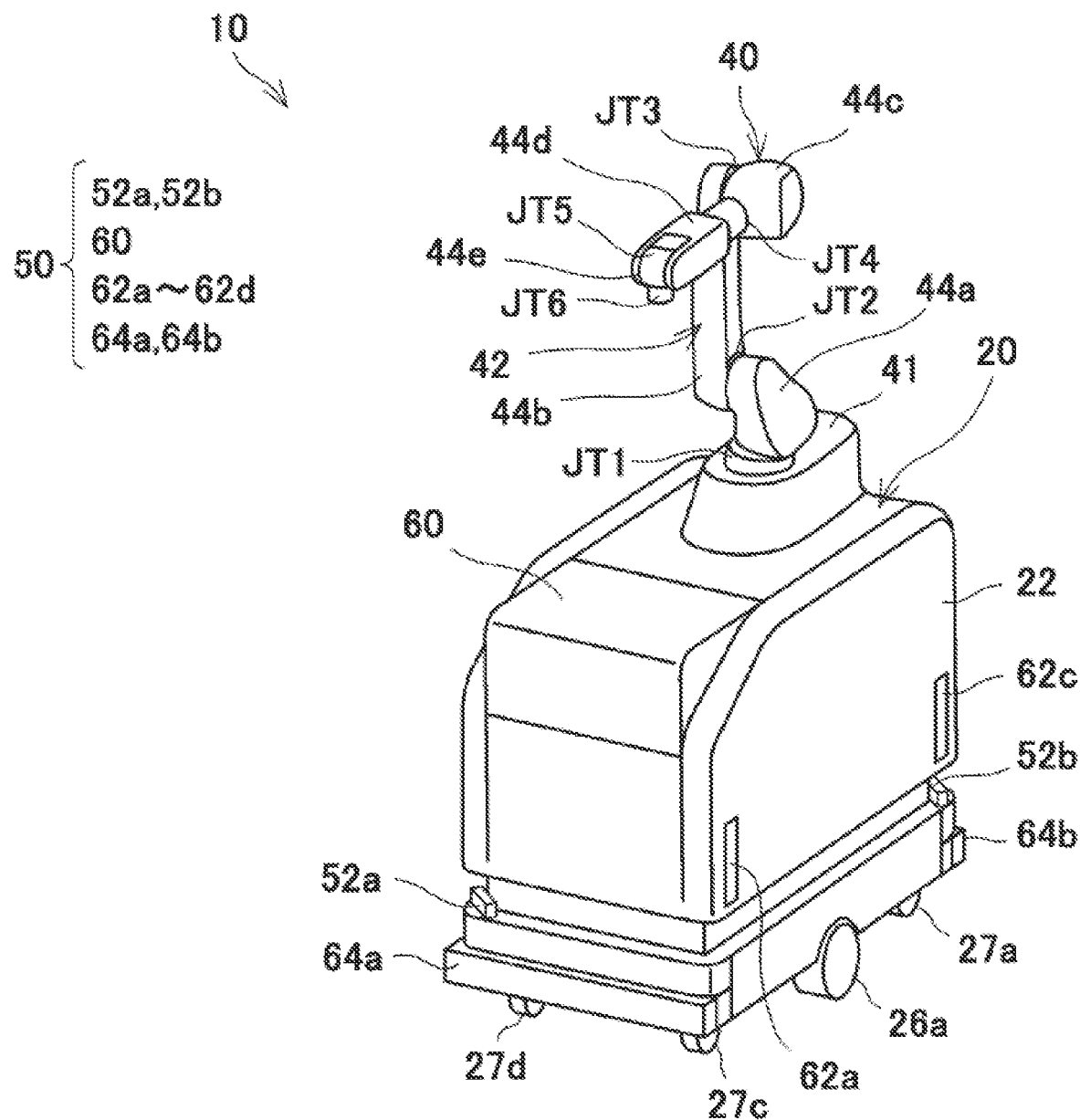
FIG. 2 is a perspective view illustrating the entire configuration of the self-propelled robot system according to one embodiment of the present disclosure.

FIG. 2 is a perspective view illustrating the entire configuration of the self-propelled robot system according to this embodiment. As illustrated in FIG. 2, the self-propelled robot system 10 includes an AGV (Automated Guided Vehicle) 20 as a self-propellable travel device, and a vertical articulated robot 40 as a robot provided on an upper surface of the AGV 20. Further, the self-propelled robot system 10 further includes a safety device 50 which is provided for the AGV 20 and the vertical articulated robot 40.

(AGV 20)

The AGV 20 includes a rectangular parallelepiped casing 22, a drive 24 (see FIG. 4) provided inside the casing 22, two driving wheels 26a and 26b which are driven by the drive 24, and four wheels 27a-27d which are not connected to the drive 24.

The driving wheel 26a is provided to the center of a left edge part of the bottom surface of the AGV 20, and it is driven by a servomotor 110g (see FIG. 4) of the drive 24 (same as above). Further, the driving wheel 26b is provided to the center of a right edge part of the bottom surface of the AGV 20, and it is driven by a servomotor 110h (same as above) of the drive 24 (same as above). For example, the AGV 20 can spin, and can make a right turn and a left turn by differentiating rotational speeds of the driving wheels 26a and 26b from each other. The four wheels 27a-27d are provided to corner parts of the bottom surface of the AGV 20, respectively. Each of the four wheels 27a-27d may be an omnidirectional caster wheel.

(Vertical Articulated Robot 40)

The vertical articulated robot 40 includes a pedestal 41 which is fixed to the upper surface of the casing 22 of the AGV 20, a robotic arm 42 of which a base end is coupled to the pedestal 41, an end effector (not illustrated) provided to a tip end of the robotic arm 42, and a robot control device 100 (see FIG. 4: control device) for controlling operations of the robotic arm 42 and the end effector.

As illustrated in FIG. 2, the robotic arm 42 includes six joint axes JT1-JT6, and five links 44a-44e serially coupled through the joint axes JT1-JT6. Note that the joint axes JT1-JT6 are driven by servomotors 110a-110f, respectively (see FIG. 4).

The joint axis JT1 couples the pedestal 41 to a base end of the link 44a so as to be rotatable on an axis extending in the vertical direction. The rotation of the link 44a with respect to the pedestal 41 is performed by the servomotor 110a (see FIG. 4). The joint axis JT2 couples a tip end of the link 44a to a base end of the link 44b so as to be rotatable on an axis extending in the horizontal direction. The rotation of the link 44b with respect to the link 44a is performed by the servomotor 110b (same as above). The joint axis JT3 couples a tip end of the link 44b to a base end of the link 44c so as to be rotatable on an axis extending in the horizontal direction. The rotation of the link 44c with respect to the link 44b is performed by the servomotor 110c (same as above).

The joint axis JT4 couples a tip end of the link 44c to a base end of the link 44d so as to be rotatable on an axis extending in the longitudinal direction of the link 44c. The rotation of the link 44d with respect to the link 44c is performed by the servomotor 110d (see FIG. 4). The joint axis JT5 couples a tip end of the link 44d to a base end of the link 44e so as to be rotatable on an axis extending in a direction perpendicular to the longitudinal direction of the link 44d. The rotation of the link 44e with respect to the link 44d is performed by the servomotor 110e (same as above). The joint axis JT6 couples a tip end of the link 44e to a base end of the end effector (not illustrated) so as to be twistable. The rotation of the end effector with respect to the link 44e is performed by the servomotor 110f (same as above).

(Safety Device 50)

Figure 3:
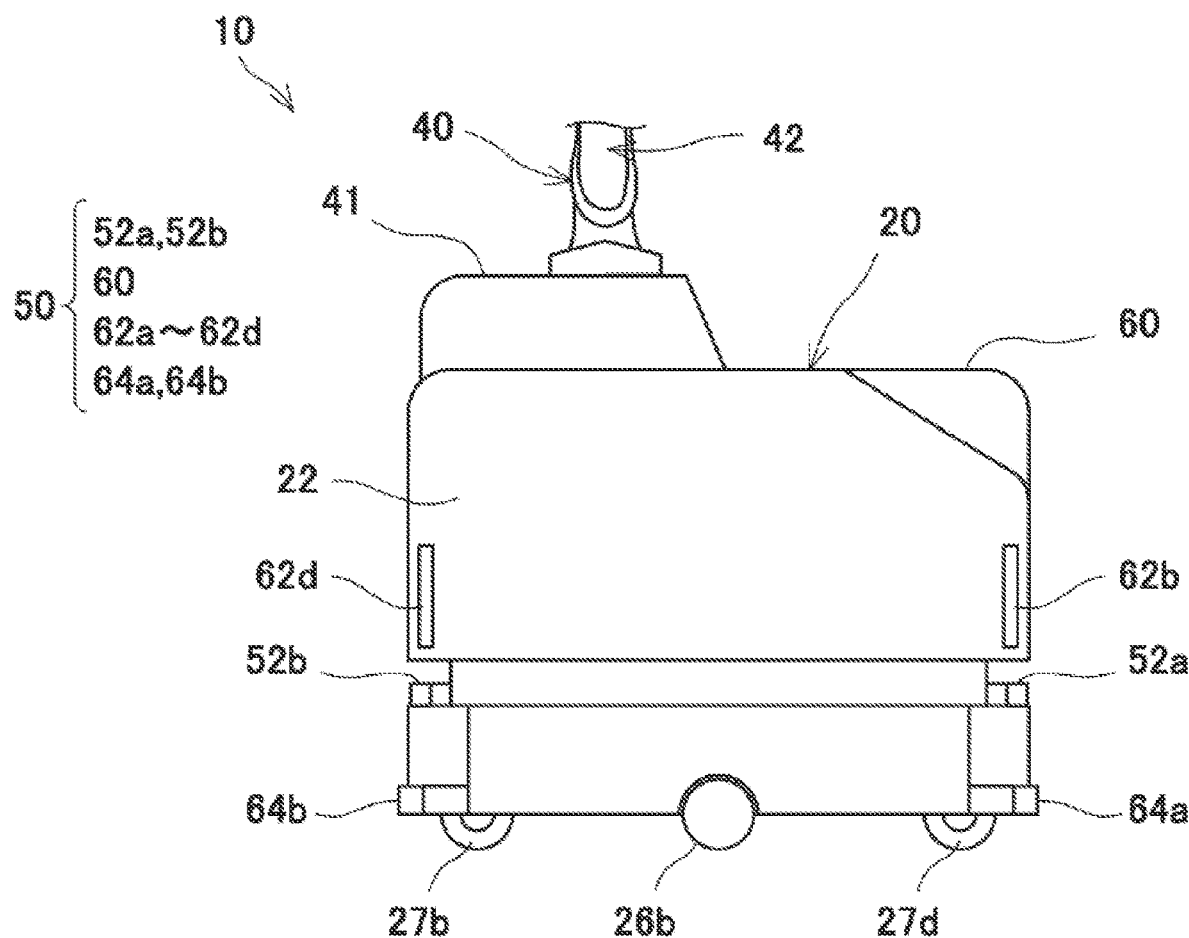
FIG. 3 is a side view illustrating a configuration of a substantial part of the self-propelled robot system according to one embodiment of the present disclosure.
Figure 4:
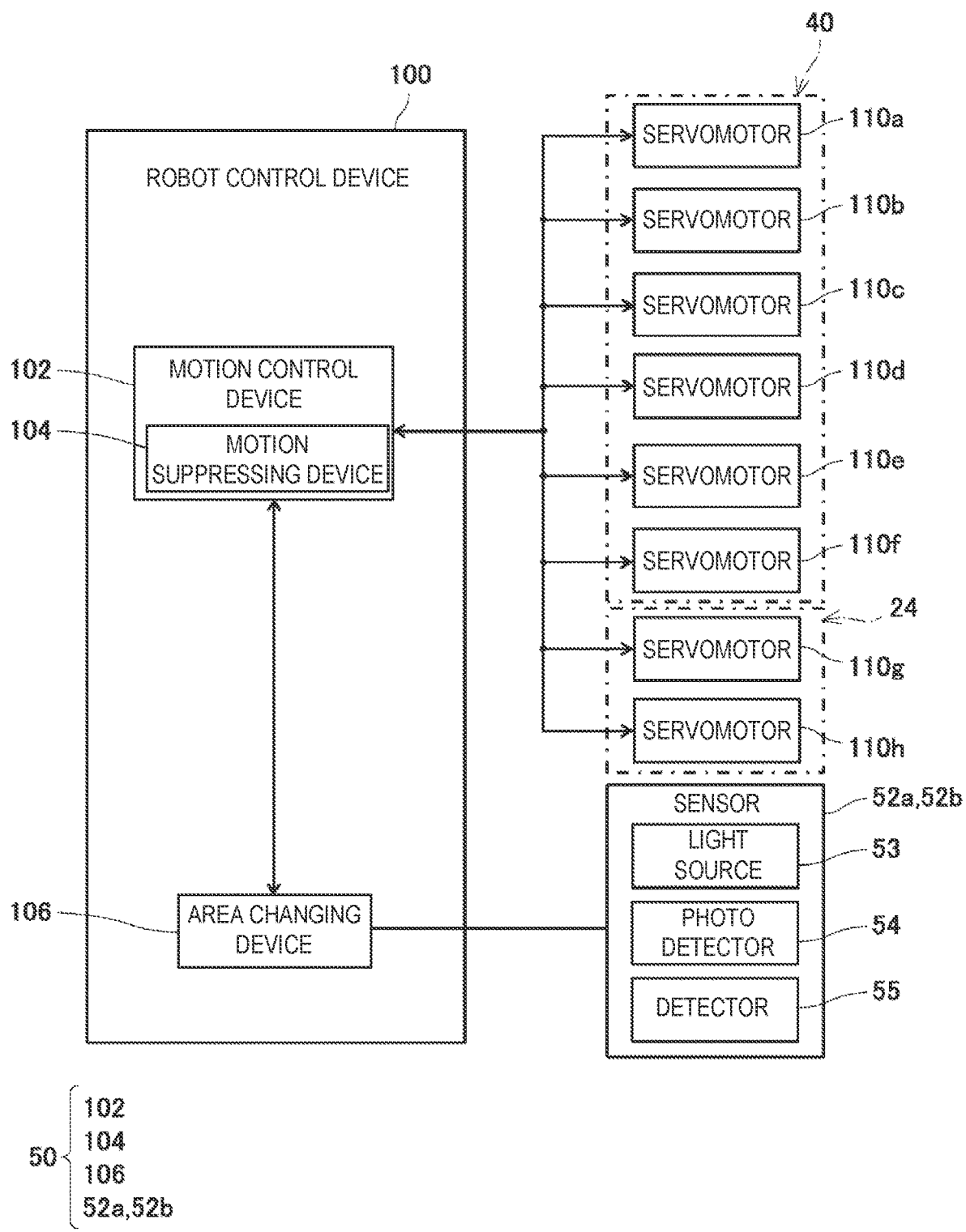
FIG. 4 is a block diagram illustrating a control system of the self-propelled robot system according to one embodiment of the present disclosure.

FIG. 3 is a side view illustrating a configuration of a substantial part of the self-propelled robot system according to this embodiment. Further, FIG. 4 is a block diagram illustrating a control system of the self-propelled robot system. As illustrated in FIGS. 2 to 4, the safety device 50 according to this embodiment is provided with two laser sensors 52a and 52b (sensors) attached to the casing 22 of the AGV 20.

In detail, the laser sensor 52a is attached to a bottom part at a corner where the front surface and the right surface of the casing 22 meet, and the laser sensor 52b is attached to a bottom part at a corner where the rear surface and the left surface of the casing 22 meet. In other words, the laser sensors 52a and 52b are provided to respective two corners of the casing 22 which are not adjacent to each other in the plan view. Note that the laser sensor 52b has the same structure as the laser sensor 52a. Therefore, below, unless particularly required, only the laser sensor 52a is described, and similar explanation will not be repeated for the laser sensor 52b.

As illustrated in FIG. 4, the laser sensor 52a includes a light source 53 which radially emits a laser beam centering on itself, within a given detectable area Da (see FIG. 5) which will be described later, a photo detector 54 which is disposed adjacent to the light source 53, and receives the laser beam which is bounced back from an object which exists within the given detectable area Da (e.g., the other self-propelled robot system 10 and the worker P which are illustrated in FIG. 1), and a detector 55 which detects the object which exists within the given detectable area Da (same as above) based on a light-receiving state of the photo detector 54. Note that a buzzer 60, state indicating lamps 62a-62d, and bumper switches 64a and 64b, which are illustrated in FIG. 3, will be described later.

As illustrated in FIG. 4, the robot control device 100 is provided with a motion control device 102 for controlling operations of the AGV 20 and the vertical articulated robot 40.

The motion control device 102 is capable of servo-controlling operation of the robotic arm 42. The motion control device 102 is also capable of servo-controlling operation of the end effector (not illustrated) provided to a tip end of the robotic arm 42, as an external axis. The motion control device 102 is also capable of servo-controlling operation of the driving wheels 26a and 26b as external axes, and is also capable of servo-controlling operation of the driving wheels 26c and 26d as external axes.

Note that the robot control device 100 may control operation of the buzzer 60, the state indicating lamps 62a-62d, and the bumper switches 64a and 64b, which will be described later. A motion suppressing device 104 and an area changing device 106 which are illustrated in FIG. 4 will be described later.

Figure 5:
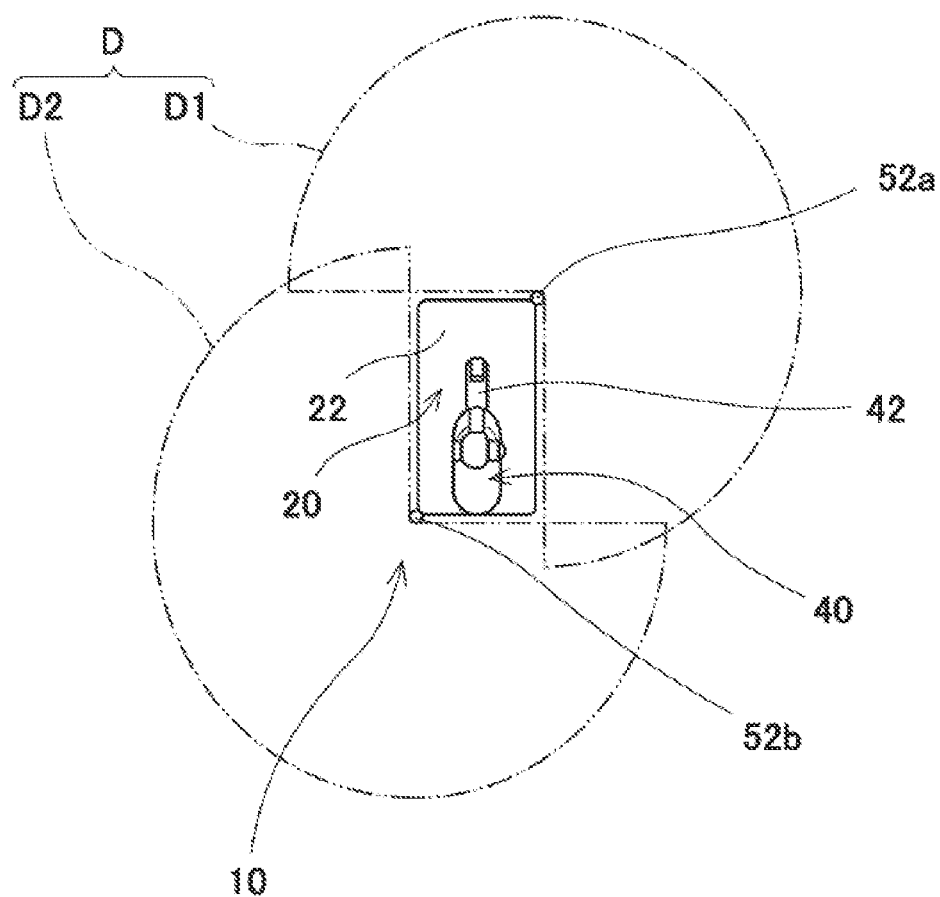
FIG. 5 is a schematic view illustrating a given detectable area which is set by a safety device according to one embodiment of the present disclosure.

FIG. 5 is a schematic view illustrating a given detectable area which is set by the safety device according to this embodiment. As illustrated in FIG. 5, the laser sensor 52a radially emits the laser beam by the light source 53, centering on itself. At this time, since the laser sensor 52a is attached to the bottom part at the corner of the casing 22 of the AGV 20 where the front surface and the right surface meet, there is an area to which the laser beam cannot be emitted because the laser beam is obstructed by the casing 22. That is, the laser sensor 52a can radially emit the laser beam centering on itself in the plan view to a 270° area from the front surface to the right surface of the casing 22. Therefore, the laser sensor 52a becomes possible to detect the object which exists within the detectable area Da illustrated by two-dot chain lines in FIG. 5.

Similarly, the laser sensor 52b radially emits a laser beam centering on itself by the light source 53. At this time, since the laser sensor 52b is attached to the bottom part at the corner of the casing 22 of the AGV 20 where the rear surface and the left surface meet, there in an area to which the laser beam cannot be emitted exists because the laser beam is obstructed by the casing 22. That is, the laser sensor 52b can radially emit the laser beam centering on itself in the plan view to a 270° area from the rear surface to the left surface of the casing 22. Therefore, the laser sensor 52b becomes possible to detect the object which exists within a detectable area Db illustrated by the two-dot chain line in FIG. 5.

The detectable area D by the safety device 50 (given detectable area) is an area which combines the detectable area Da by the laser sensor 52a and the detectable area Db by the laser sensor 52b. Note that, as illustrated in FIG. 5, the detectable area Da and the detectable area Db partially overlap with each other in the plan view.

FIGS. 6(A) and 6(B) are schematic views illustrating a given detection area which is set by the safety device according to this embodiment, where FIG. 6(A) is a schematic view illustrating a first detection area, and FIG. 6(B) is a schematic view illustrating a second detection area.

(Detection Area A1)

In FIG. 6(A), a state where the vertical articulated robot 40 is not operating, but the AGV 20 is traveling forward is illustrated. As illustrated in this drawing, in this state, the laser sensors 52a and 52b are provided so that a detection area A1 (given detection area, first detection area) is set on the basis of the positions of the laser sensors 52a and 52b, and the laser sensors 52a and 52b detect an object which exists within this detection area A1. Note that the detection area A1 is a part of the detectable area D. In other words, the detection area A1 is included in the detectable area D.

The area changing device 106 (see FIG. 4) sets the detection area A1 by masking a part of the detectable area D. The detection area A1 is set so that it extends from the AGV 20 at least in the traveling direction of the AGV 20. In FIG. 6(A), since the AGV 20 travels forward, the detection area A1 is set so that it becomes in a rectangular shape in the plan view, which extends forward of the AGV 20 from the AGV 20, and also extends slightly rearward of the AGV 20 from the AGV 20. Note that, as illustrated, the detection area A1 is set so that it has a rectangular shape including the AGV 20 in the plan view, and it also exists slightly on both the left and right sides of the AGV 20.

As illustrated in FIG. 6(A), the area changing device 106 can set a slowdown area AD1 and a stop area AS1 within the detection area A1 (given detection area, first detection area). As illustrated, the slowdown area AD1 and the stop area AS1 are set so that each has a rectangular shape, and the stop area AS1 includes the slowdown area AD1.

When the existence of the object is detected within the slowdown area AD1 by the laser sensors 52a and 52b, the motion suppressing device 104 (see FIG. 4) suppresses the motion of the AGV 20 by slowing down the traveling of the AGV 20. Further, when the existence of the object is detected within the stop area AS1 by the laser sensors 52a and 52b, the motion suppressing device 104 suppresses the motion of the AGV 20 by stopping the traveling of the AGV 20. Note that, when the existence of the object is detected both in the slowdown area AD1 and the stop area AS1, the motion suppressing device 104 may suppress the motion of the AGV 20 by stopping the traveling of the AGV 20.

Here, as illustrated in FIGS. 2 and 3, the safety device 50 according to this embodiment is further provided with a buzzer 60 which is attached to a corner of the casing 22 of the AGV 20 where the front surface and the upper surface meet. The buzzer 60 is attached so that it extends in the width direction of the casing 22.

When the existence of the object is detected within the slowdown area AD1 by the laser sensors 52a and 52b, the buzzer 60 may emit a warning sound to inform that a danger situation occurs. Further, when the existence of the object is detected within the stop area AS1 by the laser sensors 52a and 52b, the buzzer 60 may emit a louder warning sound than when the existence of the object is detected within the slowdown area AD1, to inform that the danger situation occurs.

Further, as illustrated in FIGS. 2 and 3, the safety device 50 according to this embodiment further includes the state indicating lamps 62a-62d which are attached to a center part of a corner of the casing 22 of the AGV 20 where the front surface and the left surface meet, a center part of the corner of the casing 22 where the front surface and the right surface meet, a center part of the corner of the casing 22 where the rear surface and the left surface meet, and a center part of a corner of the casing 22 where the rear surface and the right surface meet, respectively.

The state indicating lamps 62a-62b may inform that a danger situation occurs by turning on the lamp (or by blinking it), when the existence of the object is detected within the slowdown area AD1 by the laser sensors 52a and 52b. Alternatively, when the existence of the object is detected within the stop area AS1 by the laser sensors 52a and 52b, the state indicating lamps 62a-62b may inform that a danger situation occurs by tuning on the lamp in a color different from that is used when the existence of the object is detected within the slowdown area AD1 (or by blinking it violently).

Further, as illustrated in FIGS. 2 and 3, the safety device 50 according to this embodiment further includes the bumper switch 64a which is attached to the corner of the casing 22 of the AGV 20 where the front surface and the bottom surface meet, and extends in the width direction of the casing 22, and the bumper switch 64b which is attached to the corner of the casing 22 of the AGV 20 where the rear surface and the bottom surface meet, and extends in the width direction of the casing 22. The bumper switches 64a and 64b stop the operations of the AGV 20 and the vertical articulated robot 40, when the object collides the bumper switches 64a and 64b, respectively.

(Detection Area A2)

In FIG. 6(B), a state where the AGV 20 is not traveling, but the vertical articulated robot 40 is operating is illustrated. As illustrated in this drawing, in this state, the laser sensors 52a and 52b are provided so that a detection area A2 (given detection area, second detection area) is set on the basis of the positions of the laser sensors 52a and 52b, and the laser sensors 52a and 52b detect the object which exists within the detection area A2. Note that the detection area A2 is a part of the detectable area D. In other words, the detection area A2 is included in the detectable area D.

The area changing device 106 (see FIG. 4) sets the detection area A2 by masking a part of the detectable area D which is different from the detection area A1. The detection area A2 is set so that it extends from the vertical articulated robot 40 at least toward a movable area where the vertical articulated robot 40 is operable. In FIG. 6(B), since the robotic arm 42 extends rightward from the AGV 20, the detection area A2 extends rightward from the AGV 20 so as to include the robotic arm 42. Further, a part of the detection area A2 other than the part including the robotic arm 42 is set so as to have a rectangular shape which includes the casing 22 of the AGV 20 in the plan view.

As illustrated in FIG. 6(B), the area changing device 106 can set a slowdown area AD2 and a stop area AS2 within the detection area A2 (given detection area, second detection area). As illustrated, the stop area AS2 is set so as to include the slowdown area AD2.

When the existence of the object within the slowdown area AD2 is detected by the laser sensors 52a and 52b, the motion suppressing device 104 (see FIG. 4) decelerates the motion of the vertical articulated robot 40 to suppress the motion of the vertical articulated robot 40. Further, when the existence of the object within the stop area AS2 is detected by the laser sensors 52a and 52b, the motion suppressing device 104 stops the vertical articulated robot 40 to suppress the motion of the vertical articulated robot 40. Note that, when the existence of the object is detected both in the slowdown area AD2 and the stop area AS2, the motion suppressing device 104 may stop the vertical articulated robot 40 to suppress the motion of the vertical articulated robot 40.

Figure 6:
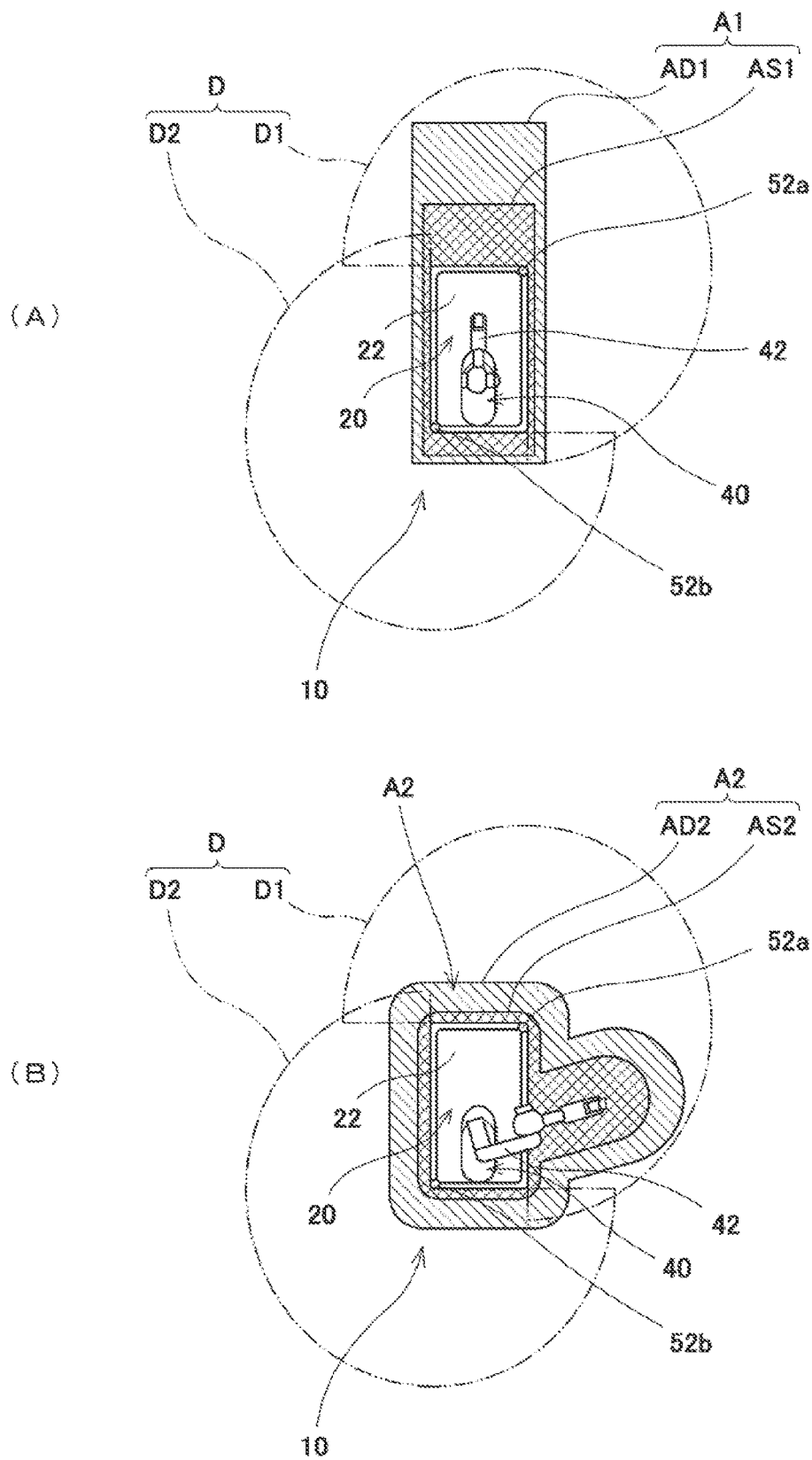
FIGS. 6(A) and 6(B) are schematic views illustrating a given detection area which is set by the safety device according to one embodiment of the present disclosure, where

Note that, since operations of the buzzer 60, the state indicating lamps 62a-62d, and the bumper switches 64a and 64b are the same as those of the detection area A1 described based on FIG. 6, explanation will not be repeated here.

As described above, the area changing device 106 can switch between the detection area A1 illustrated in FIG. 6(A) and the detection area A2 illustrated in FIG. 6(B) by changing the masked part of the detectable area D according to the operating states of the AGV 20 and the vertical articulated robot 40.

(Effects)

The safety device 50 according to this embodiment can switch between the detection area A1 and the detection area A2 by the area changing device 106 according to the operating states of the AGV 20 and the vertical articulated robot 40. Therefore, the safety device 50 becomes possible to suppress the motions of the AGV 20 and the vertical articulated robot 40 according to the operating states of the AGV 20 and the vertical articulated robot 40.

In this embodiment, when the vertical articulated robot 40 is not operating, but the AGV 20 is traveling, the area changing device 106 sets the detection area A1 illustrated in FIG. 6(A) by masking a part of the detectable area D. Further, when the AGV 20 is not traveling, but the vertical articulated robot 40 is operating, the area changing device 106 sets the detection area A2 illustrated in FIG. 6(B) by masking a different part of the detectable area D from the detection area A1. Thus, in this embodiment, it becomes possible to efficiently suppress the motions of the AGV 20 and the vertical articulated robot 40 by switching between the detection area A1 and the detection area A2.

In this embodiment, the area changing device 106 sets the slowdown area AD1 and the stop area AS1 within the detection area A1, and sets the slowdown area AD2 and the stop area AS2 within the detection area A2. Thus, in this embodiment, it becomes possible to appropriately suppress the motions of the AGV 20 and the vertical articulated robot 40.

In this embodiment, the casing 22 of the AGV 20 is formed in the rectangular parallelepiped shape, and the laser sensors 52a and 52b are provided to the respective two corners of the casing 22, which are not adjacent to each other in the plan view. Thus, in this embodiment, it becomes possible to obtain a sufficiently large detectable area D only using the two laser sensors 52a and 52b.

Since the safety device 50 according to this embodiment is provided with the buzzer 60, the state indicating lamps 62a-62d, and the bumper switches 64a and 64b, it becomes possible to secure the safety much more certainly.

(Detection Area A3)

Figure 7:
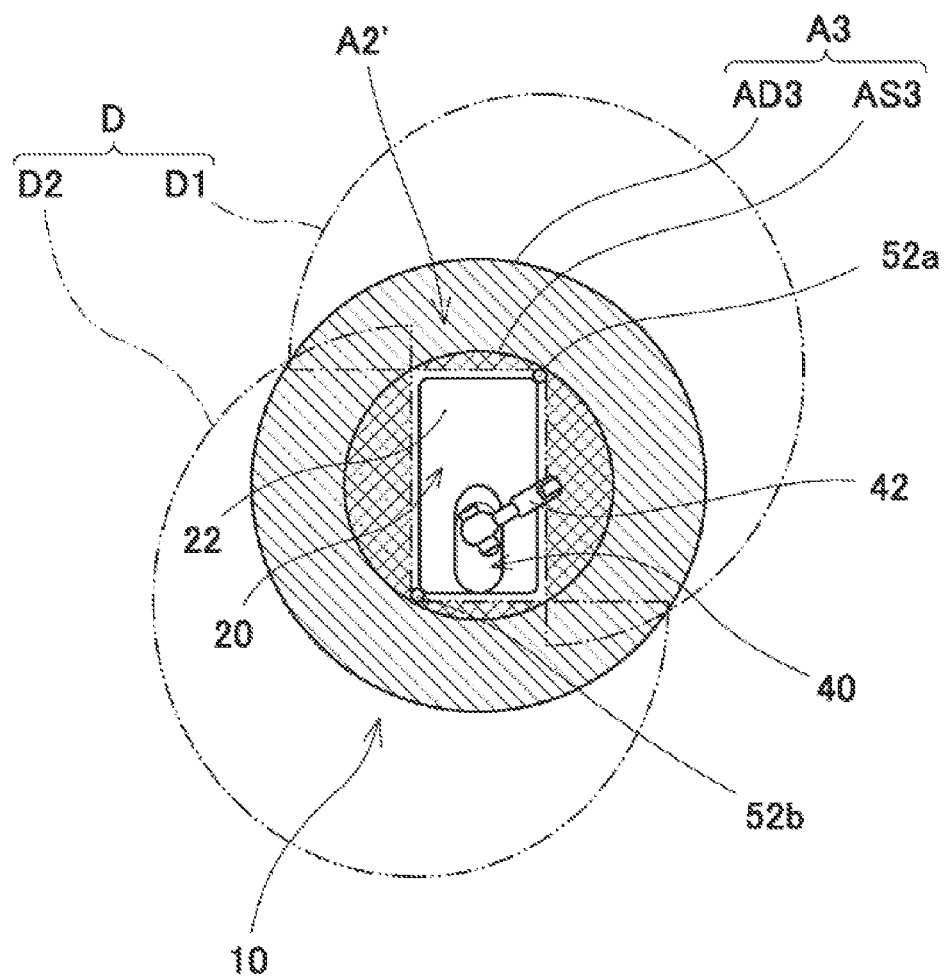
FIG. 7 is a schematic view illustrating a third detection area which is set by the safety device according to one embodiment of the present disclosure.

FIG. 7 is a schematic view illustrating a third detection area which is set by the safety device according to this embodiment. In FIG. 7, a state where the AGV 20 is traveling and the vertical articulated robot 40 is operating is illustrated. As illustrated in this drawing, the area changing device 106 (see FIG. 4) sets a detection area A3 (given detection area, third detection area) by masking a part of the detectable area D which is different from the detection areas A1 and A2. The detection area A3 is set to become a circle so that its center overlaps with the center of the casing 22 of the AGV 20 in the plan view.

As illustrated in FIG. 7, the area changing device 106 can set a slowdown area AD3 and a stop area AS3 within the detection area A3. As illustrated, the slowdown area AD3 and the stop area AS3 are concentric circles, and the stop area AS3 includes the slowdown area AD3.

For example, when the AGV 20 is traveling and the vertical articulated robot 40 is operating, the area changing device 106 may change the size of the detection area A3 (in other words, the sizes of the slowdown area AD3 and the stop area AS3) according to operating speeds of the AGV 20 and the vertical articulated robot 40. For example, when at least one of the AGV 20 and the vertical articulated robot 40 carries out a high-speed operation, the area changing device 106 may increase the detection area A3.

Note that, when the AGV 20 is traveling and the vertical articulated robot 40 is operating, the area changing device 106 may make the shape of the detection area as the shape of the detection area A1 illustrated in FIG. 6(A) or may make it as the shape of the detection area A2 illustrated in FIG. 6(B), instead of the shape of the detection area A3 illustrated in FIG. 7.

Modifications

It is apparent for the person skilled in the art that many improvements and other embodiments of the present disclosure are possible from the above description. Therefore, the above description is to be interpreted only as illustration, and it is provided to order to teach the person skilled in the art the best mode that implements the present disclosure. The details of the structures and/or the functions may be changed substantially, without departing from the spirit of the present disclosure.

In the above embodiment, the casing 22 has the rectangular parallelepiped shape, and the laser sensors 52a and 52b are provided to the two corners of the casing 22 which are not adjacent to each other in the plan view. However, it is not limited to this case, but the casing 22 may have a polygonal prism shape other than the rectangular parallelepiped shape, or may have other shapes. Further, for example, only one laser sensor may be disposed at the center of the upper surface of the casing 22. Alternatively, one or, three or more laser sensors may be attached to the casing 22. Alternatively, the laser sensor may be attached to the vertical articulated robot 40.

In the above embodiment, the area changing device 106 is switchable between the detection area A1 (first detection area) illustrated in FIG. 6(A) and the detection area A2 (second detection area) illustrated in FIG. 6(B).

However, it is not limited to this case, but, for example, the first detection area may be set to have, in the plan view, an oval shape which extends from the AGV 20 at least in the traveling direction of the AGV 20, or may be set to have other shapes. Further, for example, the second detection area may be set to have, in the plan view, a rectangular shape which is different from the shape of the first detection area, or may be set to have other shapes.

In the above embodiment, the area changing device 106 sets the slowdown area AD1 and the stop area AS1 within the detection area A1 (given detection area, first detection area), and sets the slowdown area AD2 and the stop area AS2 within the detection area A2 (given detection area, second detection area). However, it is not limited to this case, but the area changing device 106 may be settable of at least either one of the slowdown area and the stop area within the given detection area.

In the above embodiment, the sensor is comprised of so-called "reflection type" laser sensors 52*a* and 52*b*. However, it is not limited to this case, but the sensor may be comprised of a so-called "transmission type" laser sensor which collaborates with a sensor attached to an outer wall etc., or may be comprised of other sensors.

In the above embodiment, the robot is comprised of the vertical articulated robot 40 which has the six joint axes JT1-JT6. However, it is not limited to this case, but the robot may be comprised of a vertical articulated robot which has at least one joint axis, not with the six axes. Alternatively, the robot may be comprised of a dual-arm robot, or may be comprised of a horizontal articulated robot, or may be comprised of other robots.

In the above embodiment, the motion suppressing device 104 and the area changing device 106 are constituted as a part of the robot control device 100 (control device) for controlling the operations of the AGV 20 and the vertical articulated robot 40, respectively. However, it is not limited to this case, but the motion suppressing device and the area changing device may be provided separately from the control device.

(Controlling Method)

Figure 8:
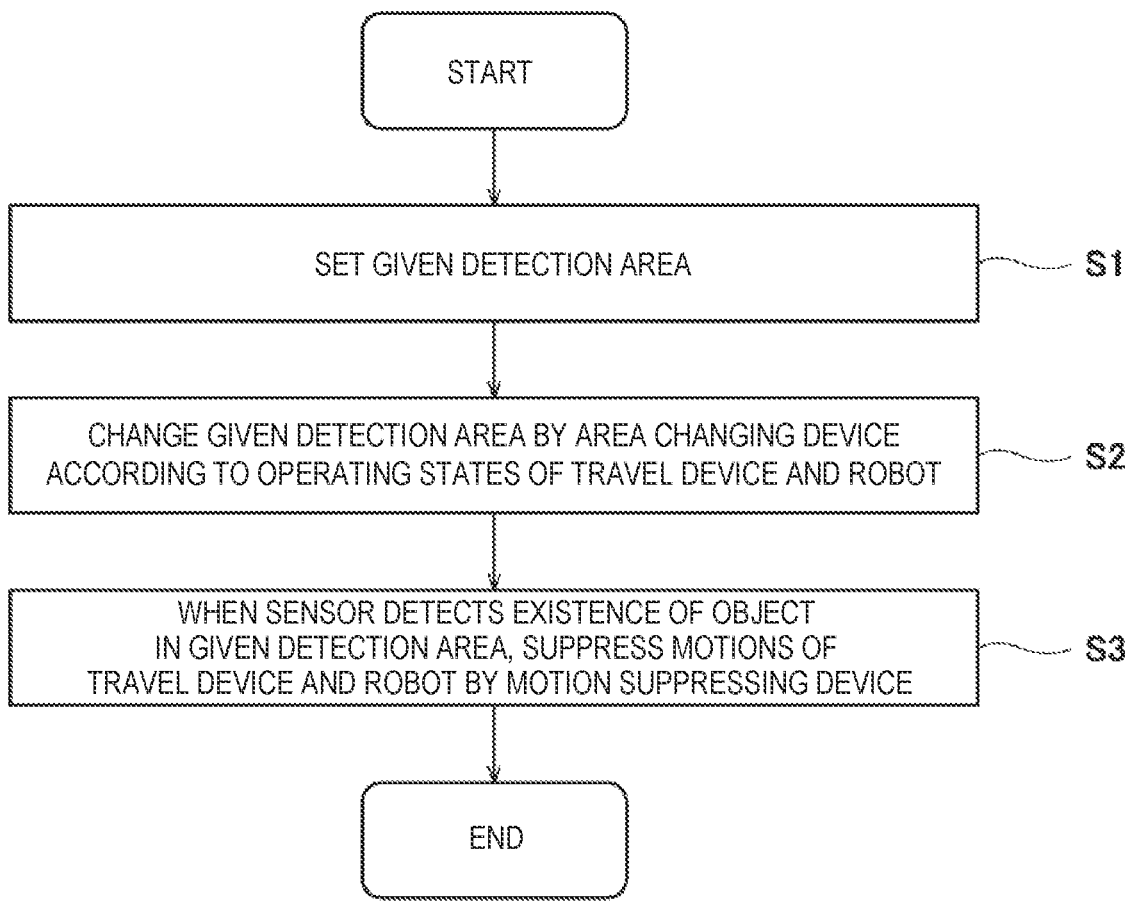
FIG. 8 is a flowchart illustrating a controlling method according to one embodiment of the present disclosure.

At last, using the safety device 50 described above, one example of the controlling method for controlling the operations of the AGV 20 (travel device) and the vertical articulated robot 40 (robot) is mainly described based on FIG. 8. FIG. 8 is a flowchart illustrating the controlling method according to this embodiment.

First, the laser sensors 52*a* and 52*b* (sensor) perform a first step for setting a given detection area (in FIG. 8, Step S1).

Next, according to the operating states of the AGV 20 (travel device) and the vertical articulated robot 40 (robot), the area changing device 106 performs a second step for changing the given detection area (in FIG. 8, Step S2).

At last, when the existence of an object within the given detection area is detected by the laser sensors 52*a* and 52*b* (sensor), the motion suppressing device 104 performs a third step for suppressing the motions of the AGV 20 (travel device) and the vertical articulated robot 40 (robot) (in FIG. 8, Step S3).

According to the configuration, the controlling method according to this embodiment becomes possible to suppress the AGV 20 and the vertical articulated robot 40 according to the operating states of the AGV 20 (travel device) and the vertical articulated robot 40 (robot), by using the safety device 50 described above.

SUMMARY

In order to solve the problem described above, the safety device according to one embodiment of the present disclosure includes the sensor that is attached to the self-propellable travel device or the robot provided to the travel device, is set with the given detection area on the basis of the position of the sensor, and detects the object existing within the given detection area, the motion suppressing device that suppresses motions of the travel device and the robot, when the existence of the object within the given detection area is detected by the sensor, and the area changing device that changes the given detection area according to the operating states of the travel device and the robot.

According to this configuration, the safety device according to one embodiment of the present disclosure is capable of suppressing the motions of the travel device and the robot according to the operating states of the travel device and the robot.

The area changing device may be changeable between the first detection area as the given detection area extending from the travel device at least in the traveling direction of the travel device, when the robot does not operate and the travel device travels, and the second detection area as the given detection area extending from the robot at least toward the movable area where the robot is operable, when the travel device does not travel and the robot operates.

According to this configuration, the safety device according to one embodiment of the present disclosure is capable of efficiently suppressing the motions of the travel device and the robot.

For example, the area changing device may be changeable of the given detection area to the third detection area, when the travel device travels and the robot operates.

The area changing device may be settable of at least either one of the slowdown area and the stop area within the given detection area. When the existence of the object is detected within the slowdown area by the sensor, the motion suppressing device may decelerate the motions of the travel device and the robot, and when the existence of the object is detected within the stop area by the sensor, the motion suppressing device may stop the motions of the travel device and the robot.

According to this configuration, the safety device according to one embodiment of the present disclosure can appropriately suppress the motions of the travel device and the robot.

For example, the sensor may be constituted as the laser sensor having the light source that radially emits a laser beam centering on the light source, within the given detectable area including the given detection area, the photo detector that is disposed adjacent to the light source, and receives the laser beam bounced back from the object existing within the given detectable area, and the detector that detects the object existing within the given detectable area based on the light-receiving state of the photo detector. The area changing device may change the given detection area by changing the masked part of the given detectable area.

The travel device may have the rectangular parallelepiped casing, the drive provided to the casing, and the driving wheel driven by the drive. The laser sensor may be provided to at least two corners of the casing that are not adjacent to each other in a plan view.

According to this configuration, the safety device according to one embodiment of the present disclosure is capable of obtaining the sufficiently large detectable area without being provided with laser sensors beyond necessity.

At least one of the area changing device and the motion suppressing device may be constituted as a part of the control device that controls the operations of the travel device and the robot.

According to this configuration, the entire device can be more compact.

In order to solve the problem described above, the self-propelled robot system according to the present disclosure includes the safety device having any one of the configurations described above, the travel device, and the robot.

According to this configuration, since the self-propelled robot system according to one embodiment of the present disclosure is provided with the safety device having any one of the configurations described above, it becomes possible to suppress the motions of the travel device and the robot according to the operating states of the travel device and the robot.

For example, the robot may be constituted as the vertical articulated robot.

For example, the travel device may be constituted as the automated guided vehicle.

In order to solve the problem described above, the controlling method according to one embodiment of the present disclosure is the method of controlling operations of the travel device and the robot by using the safety device having any one of the configurations described above, which includes the steps of (first step) setting the given detection area, (second step) changing the given detection area by the area changing device according to the operating states of the travel device and the robot, and (third step) suppressing the motions of the travel device and the robot by the motion suppressing device, when the existence of the object within the given detection area is detected by the sensor.

According to this configuration, the controlling method according to one embodiment of the present disclosure uses the safety device having any one of the configurations described above so as to suppress the motions of the travel device and the robot according to the operating states of the travel device and the robot.

The invention claimed is:

1. A safety device, comprising:
a sensor that is attached to a self-propellable travel device or a robot provided to the travel device, is set with a given detection area on the basis of a position of the sensor, and detects an object existing within the given detection area;
a motion suppressing device that suppresses motions of the travel device and the robot, when the existence of the object within the given detection area is detected by the sensor; and
an area changing device that changes the given detection area according to operating states of the travel device and the robot, wherein
the area changing device is changeable between:
a first detection area as the given detection area extending from the travel device at least in a traveling direction of the travel device, when the robot does not operate and the travel device travels, and
a second detection area as the given detection area extending from the robot at least toward a movable area where the robot is operable, when the travel device does not travel and the robot operates.

2. A safety device, comprising:
a sensor that is attached to a self-propellable travel device or a robot provided to the travel device, is set with a given detection area on the basis of a position of the sensor, and detects an object existing within the given detection area;
a motion suppressing device that suppresses motions of the travel device and the robot, when the existence of the object within the given detection area is detected by the sensor; and
an area changing device that changes the given detection area according to operating states of the travel device and the robot, wherein
the area changing device is changeable of the given detection area to a third detection area, when the travel device travels and the robot operates.

3. The safety device of claim 2, wherein the area changing device is settable of at least either one of a slowdown area and a stop area within the given detection area, and
wherein, when the existence of an object is detected within the slowdown area by the sensor, the motion suppressing device decelerates motions of the travel device and the robot, and when the existence of an object is detected within the stop area by the sensor, the motion suppressing device stops the motions of the travel device and the robot.

4. The safety device of claim 2, wherein the sensor is constituted as a laser sensor having:
a light source that radially emits a laser beam centering on the light source, within a given detectable area including the given detection area;
a photo detector that is disposed adjacent to the light source, and receives the laser beam bounced back from the object existing within the given detectable area; and
a detector that detects the object existing within the given detectable area based on a light-receiving state of the photo detector, and
wherein the area changing device changes the given detection area by changing a masked part of the given detectable area.

5. The safety device of claim 4, wherein the travel device has a rectangular parallelepiped casing, a drive provided to the casing, and a driving wheel driven by the drive, and
wherein the laser sensor is provided to at least two corners of the casing that are not adjacent to each other in a plan view.

6. The safety device of claim 2, wherein at least one of the area changing device and the motion suppressing device is constituted as a part of a control device that controls the operations of the travel device and the robot.

7. A self-propelled robot system, comprising:
the safety device of claim 1;
the travel device; and
the robot.

8. The self-propelled robot system of claim 7, wherein the robot is constituted as a vertical articulated robot.

9. The self-propelled robot system of claim 7, wherein the travel device is constituted as an automated guided vehicle.

10. A self-propelled robot system, comprising:
the safety device of claim 2;
the travel device; and
the robot.

11. The self-propelled robot system of claim 10, wherein the robot is constituted as a vertical articulated robot.

12. The self-propelled robot system of claim 10, wherein the travel device is constituted as an automated guided vehicle.

* * * * *